United States Patent Office 3,453,539
Patented July 1, 1969

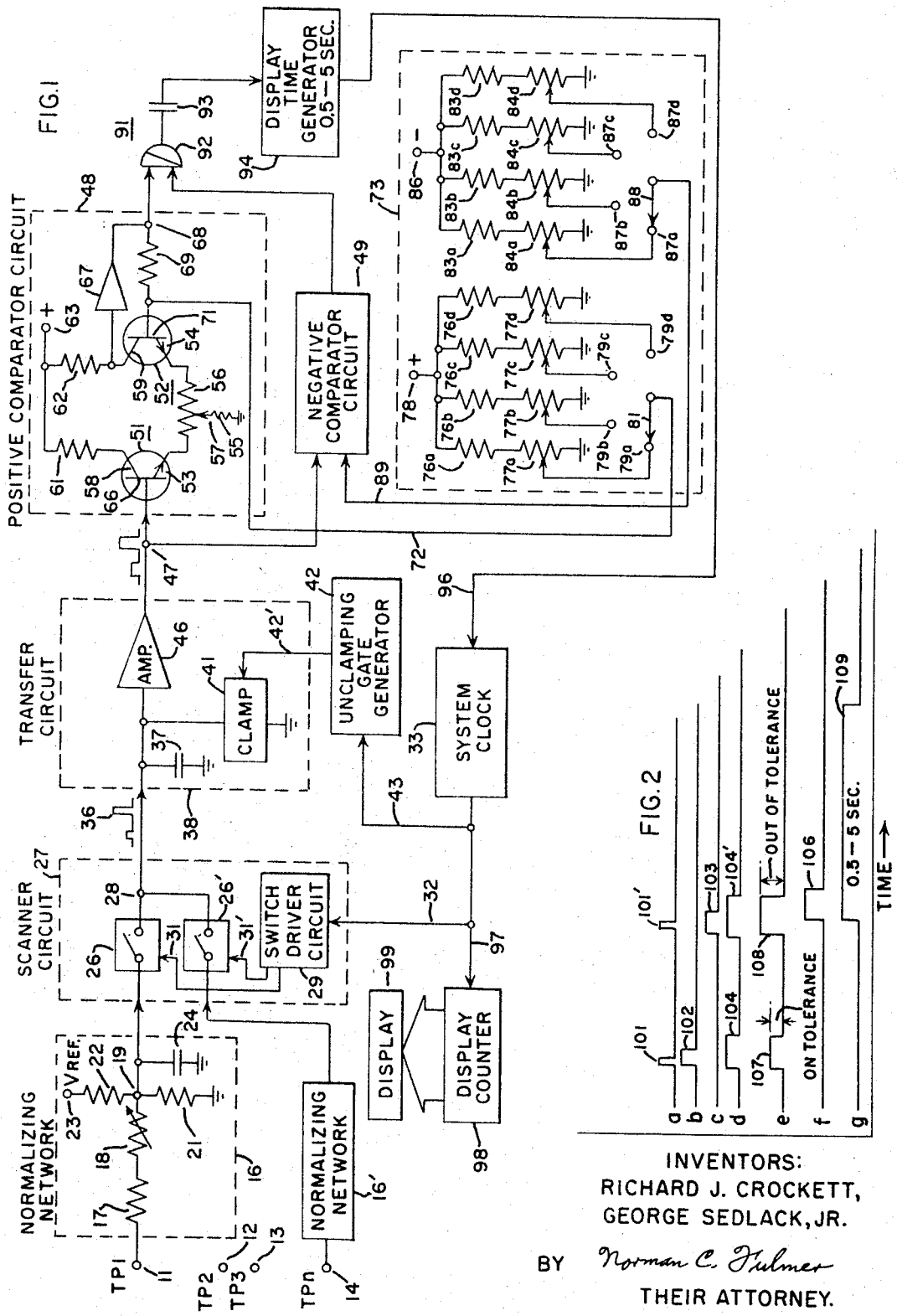

3,453,539
APPARATUS FOR SEQUENTIALLY MONITORING ELECTRICAL VOLTAGES INCLUDING A CAPACITOR TRANSFER SYSTEM AND MARGINAL PREDICTION MEANS
Richard J. Crockett, Liverpool, and George Sedlack, Jr., Syracuse, N.Y., assignors to General Electric Company, a corporation of New York
Filed Dec. 19, 1966, Ser. No. 602,946
Int. Cl. G01r 19/16
U.S. Cl. 324—73        2 Claims

ABSTRACT OF THE DISCLOSURE

An arrangement is disclosed for sequentially testing a plurality of test points of an electrical apparatus (computer, radar, sonar, etc.), and for indicating whether any of the test-point voltages are outside of acceptable limits. The arrangement converts the test-point voltages to "normalized" voltage charges on capacitors respectively associated with the test points, and a scanner sequentially transfers these capacitor voltage charges to another capacitor, where each voltage is measured in turn. Whenever an out-of-limits voltage is thus detected, an inhibiting circuit temporarily stops the scanning while an alarm or fault display is activated. Means are provided for narrowing the testing limits, when desired, in order to detect any potentially faulty voltages at the test points.

Background of the invention

The invention relates to arrangements for automatically monitoring test-point voltages of electrical apparatus such as computers, radar, sonar and the like, in order to detect faults in the apparatus as caused or indicated by the test-point voltages deviating from their acceptable operating range limits. When a test-point voltage has thus been found to have deviated beyond acceptable limits, corrective action can be taken such as adjusting the voltage or adjusting, repairing, or replacing component parts.

In a typical electronic test-point monitoring arrangement it is desired to monitor, by way of example, the voltages at 500 test points rapidly and sequentially at a repetitive rate of 10,000 test points per second. Thus, each test point can be monitored 20 times per second, which results in a desirable substantially continuous monitoring of each test point. However, such a fast monitoring rate tends to be accompanied by a problem of reliably measuring each test voltage during the short testing intervals; for example, at a testing rate of 10,000 test points per second, each testing time interval is substantially less than one ten-thousandth of a second due to wasted time intervals while switching from one test-point to the next. This problem is more severe when the switching is accomplished by low-impedance transistor devices, because voltage is more difficult to measure quickly and accurately at low impedance than at high impedance. However, transistor switching circuits have numerous advantages over high-impedance vacuum tube circuits, such as smaller size, less heat dissipation, lower power consumption, and faster switching action.

Another problem of the prior-art high-speed monitoring circuits is the adequate indication or display of an out-of-limits test voltage which occurs at a rapid rate and low duty cycle. This requires undesirable compromises, such as inactivation of the monitoring system until a detected fault is remedied; manual intervention by an operator to reset the system; or additional circuitry which adds to the complexity and cost of the system.

Summary of the invention

Objects of the invention are to provide an improved reliability monitor for electrical apparatus; to solve the prior-art problems mentioned above; and to detect potential faults before they become actual faults.

The improved reliability monitor of the invention comprises, briefly and in a preferred embodiment, networks respectively associated with the test points to be monitored. Each network includes a test capacitor adapted to be charged to a voltage value indicative of the test-point voltage. A switching or scanner circuit sequentially connects the network test capacitors to a single transfer capacitor, so as to sequentially transfer the electrical voltage charges of the test capacitors to the transfer capacitor. A low-impedance clamping circuit quickly discharges the transfer capacitor, during the idle time interval between each switching connection, immediately prior to switching to the next successive network test capacitor. Thus, each voltage charge on the transfer capacitor exists for a longer time interval than the time interval of an individual switching connection. In some designs, the time interval of a test voltage on the transfer capacitor may be twice that of the switched contact with the individual network test capacitors. This increased testing time facilitates accurate measurement of the testing voltage, particularly when low-impedance transistor circuits are employed. The aforesaid sequential switching function and the clamping circuit are accurately timed under the control of repetitive step-type clock pulses generated in a clock-pulse generator circuit. A display or counter device also is timed by the clock pulses, for displaying test-point numbers or indications in synchronism with the testing sequence.

A voltage comparator circuit compares each testing voltage of the transfer capacitor with a pre-set reference voltage, and if the reference voltage is exceeded (due to the testing voltage exceeding acceptable operating limits), an inhibit pulse is generated, having a time duration of a few seconds, and fed to an inhibit input of the clock pulse generator so as to temporarily "hold" the system, for a few seconds, on the test point having a faulty voltage, before proceeding with the routine sequential testing. This temporary holding at each faulty test-point, which occurs each cycle of testing, causes the display indications for the faulty test points to become visible, so that an operator can immediately observe the identification of any or all faulty test points. Upon correction or repair of a faulty test point, the cyclic "hold" for that test-point ceases, and hence its indicator no longer indicates a fault.

As another feature of the invention, a reference voltage source for the voltage comparator circuit is provided with adjustable means for reducing the reference voltage level towards zero, from both the positive and negative directions, so as to cause a narrowing of the voltage range limits, whereby an observer can determine whether any test-point voltages have deviated sufficiently so as to indicate a potential fault that is likely to occur later on.

Brief description of the drawing

In the drawing,
FIGURE 1 is an electrical diagram, partly schematic and partly in block form, showing a preferred embodiment of our invention; and
FIGURE 2 is a time-plot of signals and voltages which occur in apparatus constructed according to the circuit of FIGURE 1.

Description of the preferred embodiment

In the preferred embodiment of FIGURE 1, first, second, and third test points 11, 12, and 13 are shown, along with an *n*th test point 14 which may be, for example, the five-hundredth test point in a typical arrangement. These test points are voltage or signal test points in apparatus such as a computer, radar, sonar, etc. For test points having alternating signals or voltages, diode rectifier circuits (not shown) are provided to convert the altrenating signals to direct voltage of either positive or negative polarity. A plurality of normalizing networks 16 are respectively associated with the test points. Each normalizing network 16 may comprise a fixed resistor 17 and a variable resistor 18 connected in series between the associated test point 11 and a circuit point 19. A resistor 21 is connected between point 19 and electrical ground, and a resistor 22 is connected between point 19 and a voltage reference point 23. A test capacitor 24 is connected between the point 19 and electrical ground. Each of the normalizing networks 16 contains the circuitry shown in that associated with the first test point 11. The resistors in the normalizing networks 16 have values so that the test point voltage value is normalized to the same value, for example zero, on the test capacitor 24 in each of the normalizing networks 16. Individual adjustments can be made with the variable resistor 18.

The normalized output voltages of the normalizing networks 16 are respectively connected to electronic switches 26 in a scanner circuit 27. Each of the electronic switches 26 is, in effect, a single-pole single-throw switch having one terminal connected to an individual normalizing network output, the remaining terminals of the switches 26 being all connected together to a common scanner circuit output point 28. The switches 26 are closed momentarily and sequentially, in a cyclic manner by a switch driver circuit 29 which may comprise a well-known "ring" circuit of transistors or magnetic core units, each stage being connected to the next in a closed loop or "ring" and each of these stages being respectively connected to the individual switches 26 as indicated by the connections 31 so that, as an electrical signal rapidly circulates through the stages of the driver circuit 29, each stage sequentially generates a signal which is fed through the connections 31 to the switches 26 thereby actuating them sequentially so as to effect a rapid electronic sequential scanning of all the normalizing network output signals, and feeding these signals sequentially to the output terminal 28 of the scanner circuit 27. The circulating signal in the driver circuit 29 is controlled and synchronized by step-type pulses supplied via a connection 32 from a system clock 33 which generates accurately timed cyclic pulses. The system clock 33 provides the clock pulses at a rate of 10,000 per second, for example. This will cause the scanner circuit 27 to sequentially scan the normalizing networks 16 at a rate of 10,000 per second.

The output signal 36 of the scanner circuit 27, which is a sequential sampling of the output voltages of the various normalizing networks 16, is applied to a transfer capacitor 37 contained in a transfer circuit 38 and which is connected between the output terminal 28 of the scanner circuit 27, and electrical ground. A clamp circuit 41 is connected across the transfer capacitor 37, and may comprise a transistor, and is normally in a short-circuiting condition for discharging the transfer capacitor 37. An unclamping gate generator 42 is connected to receive clock pulses from the system clock 33 via a connection 43. The voltage signals at the transfer capacitor 37 are amplified in an amplifier 46 and applied to a terminal 47, from which they are fed to a positive comparator circuit 48 and to a negative comparator circuit 49. A suitable electrical diagram is shown schematically for the positive comparator circuit 48, and the negative comparator circuit 49 would have the same circuit schematically.

The positive comparator circuit 48 comprises a pair of transistors 51, 52 having their emitter electrodes 53, 54 connected respectively to the ends of a potentiometer 56 having an adjustable tap 57 connected to electrical ground via a resistor 55. The collector electrodes 58, 59 of the transistors 51, 52 are respectively connected via resistors 61 and 62 to a terminal 63 of operating voltage. The signal terminal 47 is connected to the base electrode 66 of the transistor 51, and an amplifier 67 is connected between the collector 59 and the positive comparator output terminal 68. A feedback resistor 69 is connected between the base electrode 71 of transistor 52 and the output terminal 68.

A source of reference voltage is connected to the base electrode 71 via a connection 72, from a voltage reference source 73. The voltage reference source 73 comprises a plurality of series combinations of a fixed resistor 76 and potentiometer 77 connected between a terminal 78 of positive reference potential, and electrical ground. For each of these series circuits, designated respectively as a, b, c and d, the adjustable taps of the potentiometers are respectively connected to contacts 79a, 79b, 79c, and 79d, which are adapted to be selectively contacted by a switching contact 81 which is connected via connector 72 to the base 71 of transistor 52. The reference voltage circuit 73 also contains a negative voltage reference source comprising a plurality of series-connected resistors 83 and potentiometers 84 connected between a terminal 86 of negative reference voltage, and electrical ground. For each of these series circuits, designated a through d, the adjustable taps of the potentiometers 84 are respectively connected to switch contacts 87a, 87b, 87c, and 87d. An adjustable switch contact 88, adapted to selectively engage the contacts 87, is connected via a connection 89 to the negative comparator circuit 49. The negative comparator circuit 49 is the same as the positive comparator circuit 48, except that the output of its amplifier 67 is reversed in phase from that of the amplifier 67 in the positive comparator circuit 48. Preferably, the adjustable switch contacts 81 and 88 are mechanically ganged so as to simultaneously engage the correspondingly lettered contact terminals of the reference voltage networks.

A pulse generator 91 comprises an "OR" circuit 92 having two inputs respectively connected to the outputs of the positive comparator circuit 48 and the negative comparator circuit 49. The output of the "OR" circuit 92 is coupled, via a differentiating capacitor 93, to the input of a display time generator 94 which may comprise a well-known type of one-shot multivibrator having an adjustable pulse-length output preferable variable in time between one-half second and five seconds. The output of the display time generator 94 is connected via a connection 96 to an inhibit gate input of the system clock 33, so that the system clock stops the generation of clock pulses during the time interval of any inhibit output pulse from the display time generator 94.

The clock pulses from the system clock 33 are applied, via a connection 97, to a display counter 98 which counts in synchronism with, and under the control of, the clock pulses. The display counter 98 may comprise a well-known ring type of counter circuit, or other known suitable counter circuits. The display counter 98 is connected to, and controls, a display system 99 which may be a visual display comprising cathode ray tubes or numerical counter tubes, for visually displaying an indication of the test point number being tested at any particular instant. Thus, whenever the system clock 33 is stopped, the display system 99 will indicate the number of the last-tested test point.

The operation of the invention will now be described, with reference to FIGURES 1 and 2. Signal a in FIGURE 2 shows the cyclic clock pulses 101 produced by the system clock 33 and applied to the switch driver circuit 29 via connections 32; to the unclamping gate generator 42 via the connection 43; and to the display counter 98 via the connection 97. These clock pulses 101 occur at the rate of, for example, 10,000 pulses per second. Signal b in FIGURE 2 represents a drive pulse 102 generated by the driver circuit 29 in synchronism with the clock pulse 101 and applied via connection 31 to the scanner switch 26, whereupon the switch 26 is closed during the time interval of the pulse 102. Signal c in FIGURE 2 represents the drive pulse 103 generated by the drive circuit 29, in synchronism with the next clock pulse 101', and applied via the connection 31' to the nth scanning switch 26', whereby the switch 26' is closed during the time interval of the pulse 103, assuming, for convenience in this example, that the nth test point 14 is the next to be tested after testing the first test point 11. The signal d in FIGURE 2 demonstrates the unclamping gate pulses 104 produced by the unclamping gate generator 42 and applied via the connection 42' to the clamp circuit 41. During the time interval of each unclamping pulse 104, 104', etc., which occurs synchronously with the clock pulses 101, 101', etc., the clamping circuit 41 is effectively an open circuit whereby the capacitor 37 receives an electrical charge from the capacitor 24 of one of the normalizing networks 16, and the capacitor 37 holds this charge until the end of the unclamping pulse 104, whereupon the clamping circuit short-circuits and discharges the capacitor 37. In the example shown, during the unclamping pulse 104 the transfer capacitor 37 is charged during the duration of the drive pulse 102 from the first normalizing network 16, and during the next unclamping pulse 104' the test capacitor 37 is charged by the nth normalizing network 16'. Of course, if the normalized voltage on a test capacitor 24 is zero, then no transfer of voltage charge to the transfer capacitor 37 will occur.

In accordance with a feature of the invention, the unclamping pulses 104 are of a longer time duration, for example twice the duration, than the time durations of the switching pulses 102, 103, etc. That is, the test voltage pulses on the test voltage capacitor 37 exists for approximately twice the time duration as that of the durations during which the individual capacitors 24 in the normalizing networks 16 are being tested. Therefore, the voltage pulses on the transfer capacitor 37 are tested not only during the times when the normalizing network capacitors 24 are being tested, but also during the intervening time required for the scanner circuit 27 to switch to the next test-point normalizing network. In accomplishing this, the capacitor 37 should have a capacitance value considerably less than that of each of the normalizing network capacitors 24, so as to become fully charged to the value of test voltage on each capacitor 24 quickly during the relatively short switching time periods of the switches 26.

Since the normalizing networks 16 convert the test point voltages to zero when they are of correct value, there will be no signal output at the output terminal 47 of the transfer circuit 38 if all test point voltages are of absolutely correct value. If any of the test point voltages deviate, either positively or negatively in polarity, from their absolutely correct value, then positive or negavoltage pulses will occur at the terminal 47 at the cyclic time intervals when the test points are tested which have voltages which have deviated from the absolutely correct value.

In normal operation of the reliability monitor, the comparison voltage switches 81 and 88 are switched to one of the comparator contacts 79 and 87, respectively, which is adjusted by means of the associated potentiometer 77, 84, to provide positive and negative voltage values indicative of the test voltage deviation limits which are to be permitted. For example, if it desired to monitor test point voltage deviations of more than plus or minus 50 millivolts from the optimum value, then the comparison voltage circuit 73 is adjusted to provide positive and negative voltages of 50 millivolts times the gain of the amplifier 46, respectively, on the connections 72 and 89.

If the amplifier 46 has a gain of 40, then the comparison voltages would be plus and minus 2 volts, in the example given. Now referring to the positive comparator circuit 48, by way of example, and assuming that the reference voltage applied to the base electrode 71 of transistor 52 via the connector 72 is plus 50 millivolts, then whenever a test pulse from terminal 47 which exceeds 50 millivolts is applied to the base electrode 66 of transistor 51, the circuit 48 triggers so as to produce at its output terminal 68 a monitor pulse 106 as shown in signal f of FIGURE 2. As shown in signal e of FIGURE 2, a test pulse 107 which is within the 50 millivolt tolerance range will not cause a monitor pulse to be generated in the comparator circuits, whereas a test pulse 108 which exceeds the 50 millivolt tolerance limit, will cause the generation of a monitor pulse 106 in the comparator circuit.

The negative comparator circuit 49 functions similarly to the positive comparator circuit 38, except that it compares the incoming test pulses with a negative reference voltage, and produces a positive output pulse whenever the input test pulse exceeds the comparison voltage level.

The "OR" circuit 92 passes a trigger pulse from either of the positive and negative comparator circuits 48 and 49, which is applied, via a differentiating capacitor 93, to the display time generator 94 which produces a longer-duration pulse, selectively variable between, for example, one-half second and five seconds duration, which, whenever it occurs, inhibits or stops the system clock 33 for that time duration. Signal g in FIGURE 2 illustrates the inhibit pulse 109 output of the display time generator 94 in relation to the monitor pulse 106.

The counter 98 and display 99 together constitute an indicator arrangement. During the cyclic scanning of test points by the scanner circuit 27, the visual display 99, under control of the display counter 98, sequentially displays the number of the test point being tested, but this sequential display is so rapid as to be not distinguishable as to any individual test point numbers. The individual indications may, or may not, be visible, depending on the type of display devices utilized. However, whenever a monitor pulse 106 is generated, due to a test voltage having deviated outside acceptable limits, the inhibiting of the system clock 33 for the time duration of the inhibit pulse 109, causes the display 99 to halt or hold for a corresponding time duration so that the last-tested (and faulty or out-of-limits) test point will be visually indicated, so that a decision can be made by an observer as to whether to adjust or repair the monitored system in order to bring the particular test point voltage within acceptable limits. If a plurality of test points are simultaneously out of limits, the above procedure will occur for each of the out-of-limit test points, i.e., the system clock will halt temporarily, for up to five seconds for example, when each out-of-limits test point is detected, whereupon the display 99 will display, in repetitive sequence, all of the faulty test points. Whenever a correction is made to restore a faulty test point voltage to an acceptable value, then the inhibit pulse 109 will no longer be generated for that test point, and hence that test point will no longer be displayed on the display 99. Thus, the invention achieves, in a simple, reliable, and economical manner, a convenient and automatic display of all of the faulty test points, and automatically removes the fault indication when the fault has been corrected.

In order to detect a potential out-of-limits test voltage, the reference voltage circuit 73 may be adjusted, by switching the contacts 81 and 88 to various other contacts 79 and 87, with the associated potentiometer taps being adjusted to various positive and negative voltage levels less than that of the "normal" reference voltage, so that the display 99 will indicate, within desired narrower-than-normal limits, test points at which the voltages have deviated slightly from the absolute optimum value. Thus, during times when there are no deviations beyond "normal" acceptable limits, or during times of especially critical functioning of the apparatus being monitored, or if the person operating the monitor desires to leave it unattended for a while, he can adjust the reference voltage switches 81, 82 to narrower testing limits and ascertain whether there are any test voltage deviations which are likely to require attention in the near future.

We claim:

1. An arrangement for automatically monitoring a plurality of test-point voltages of electrical apparatus by means of a scanner circuit for sequentially connecting the test points to a testing circuit, wherein the improvement comprises a plurality of test capacitors respectively connected to be continuously charged from said test-point voltages, a transfer capacitor, a scanner circuit connected to repetitively scan said test points and sequentially connect said test capacitors temporarily in parallel with said transfer capacitor, said transfer capacitor having a capacitance value considerably less than that of each of said test capacitors so as to become sequentially charged substantially to the voltages of said test capacitors during said temporary connections thereto, a clamp circuit connected to discharge said transfer capacitor prior to each charging thereof by a test capacitor, a source of reference voltage, a comparator circuit connected to compare the voltages on said transfer capacitor with said reference voltage and adapted to produce a monitor pulse during each scanning cycle whenever said transfer capacitor voltage exceeds said reference voltage, means to selectively reduce the value of said reference voltage for one or more cycles of scanning so as to cause production of monitor pulses at relatively lower values of transfer capacitor voltage, an inhibit pulse generator connected to receive said monitor pulses and adapted to produce an inhibit pulse in response to each monitor pulse, the inhibit pulses being of longer time duration than the monitor pulses, an indicator arrangement adapted to sequentially indicate the test points being tested, and inhibit means connected to temporarily hold the operation of said scanner circuit and said indicator arrangement during each scanning cycle upon the occurrence of each inhibit pulse whereby said indicator arrangement indicates the test points at which the voltage has deviated a predetermined amount from a nominal value.

2. An arrangement as claimed in claim 1, including a system clock circuit arranged to provide cyclic clock pulses to said scanner circuit, said clamp circuit, and said indicator arrangement for controlled synchronous operation thereof, said inhibit means comprising means connected to apply said inhibit pulses to said system clock circuit for temporarily holding the operation thereof during each scanning cycle upon the occurrence of any inhibit pulses.

References Cited

UNITED STATES PATENTS 2,970,260  1/1961  Flint _____ 324—73
3,193,803  7/1965  Hoffman _____ 324—111 XR RUDOLPH V. ROLINEC, Primary Examiner.

E. L. STOLARUN, Assistant Examiner.

U.S. Cl. X.R.

324—111